United States Patent
Lee et al.

(10) Patent No.: US 10,472,508 B2
(45) Date of Patent: Nov. 12, 2019

(54) POLYPROPYLENE COMPOSITE RESIN COMPOSITION WITH FIBER TEXTURE

(71) Applicants: HYUNDAI MOTOR COMPANY, Seoul (KR); KIA MOTORS CORPORATION, Seoul (KR); HYUNDAI EP CO., LTD., Dangjin-si, Chungcheongnam-do (KR)

(72) Inventors: Han Ki Lee, Seoul (KR); Hak Soo Kim, Yongin-si (KR); Chang Hyeon Noh, Seongnam-si (KR); Dong Han Kim, Yongin-si (KR); Kyung Soon Jang, Ansan-si (KR); Beom Ho Kim, Yongin-si (KR); Hyeok Lee, Suwon-si (KR); Wan Jo, Yongin-si (KR)

(73) Assignees: Hyundai Motor Company, Seoul (KR); Kia Motors Corporation, Seoul (KR); Hyundai EP Co., Ltd., Dangjin-si, Chungcheongnam-do (KR)

( * ) Notice: Subject to any disclaimer, the term of this patent is extended or adjusted under 35 U.S.C. 154(b) by 7 days.

(21) Appl. No.: 15/845,443

(22) Filed: Dec. 18, 2017

(65) Prior Publication Data

US 2019/0127562 A1 May 2, 2019

(30) Foreign Application Priority Data

Nov. 1, 2017 (KR) .................. 10-2017-0144807

(51) Int. Cl.
| | | |
|---|---|---|
| *C08L 23/12* | (2006.01) | |
| *C08L 23/08* | (2006.01) | |
| *C08L 23/16* | (2006.01) | |
| *C08L 97/02* | (2006.01) | |
| *C08G 63/183* | (2006.01) | |
| *C08L 1/00* | (2006.01) | |

(52) U.S. Cl.
CPC ............ *C08L 23/12* (2013.01); *C08G 63/183* (2013.01); *C08L 1/00* (2013.01); *C08L 23/0815* (2013.01); *C08L 23/16* (2013.01); *C08L 97/02* (2013.01); *C08L 2201/52* (2013.01); *C08L 2205/02* (2013.01); *C08L 2205/025* (2013.01); *C08L 2205/03* (2013.01); *C08L 2205/16* (2013.01); *C08L 2207/02* (2013.01); *C08L 2666/72* (2013.01)

(58) Field of Classification Search
CPC ........ C08L 23/12; C08L 1/00; C08L 23/0815; C08L 23/16; C08L 97/02; C08L 2201/52; C08L 2205/02; C08L 2666/72; C08G 63/183

See application file for complete search history.

(56) References Cited

U.S. PATENT DOCUMENTS

| | | | |
|---|---|---|---|
| 2011/0130487 A1* | 6/2011 | Noh et al. ................. | C08L 1/00 524/35 |
| 2015/0045479 A1 | 2/2015 | Yang et al. | |
| 2017/0313864 A1* | 11/2017 | Lee et al. ................ | C08L 23/08 |

FOREIGN PATENT DOCUMENTS

| | | | |
|---|---|---|---|
| JP | 2005-272542 A | 10/2005 | |
| JP | 2008-120867 A | 5/2008 | |
| JP | 2010-513635 A | 4/2010 | |
| JP | 2014-141663 A | 8/2014 | |
| KR | 10-0847720 B1 | 7/2008 | |
| KR | 10-1154317 B1 | 6/2012 | |
| KR | 10-1144111 B1 | 7/2012 | |
| KR | 10-2015-0113893 | 10/2015 | |
| WO | 2008-074715 A1 | 6/2008 | |
| WO | WO-2008074715 A1 * | 6/2008 | ............. C08L 23/10 |
| WO | 2015/021174 A1 | 2/2015 | |

* cited by examiner

*Primary Examiner* — Nathan M Nutter
(74) *Attorney, Agent, or Firm* — Morgan, Lewis & Bockius LLP

(57) ABSTRACT

A polypropylene composite resin composition with fiber texture includes a polypropylene resin including homopolypropylene, a first ethylene-propylene copolymer, a second ethylene-propylene copolymer or a combination thereof, and an ethylene/α-olefin copolymer, and a molded article manufactured using the same.

16 Claims, No Drawings

POLYPROPYLENE COMPOSITE RESIN COMPOSITION WITH FIBER TEXTURE

CROSS-REFERENCE TO RELATED APPLICATION

This application claims, under 35 U.S.C. § 119(a), the benefit of priority to Korean Patent Application No. 10-2017-0144807 filed on Nov. 1, 2017 with the Korean Intellectual Property Office, the entire contents of which are incorporated herein by reference.

TECHNICAL FIELD

The present disclosure relates to a polypropylene composite resin composition with fiber texture and a molded article manufactured using the same.

BACKGROUND

Vehicles, which were merely used as a transportation means in the past, have become secondary living spaces. For this reason, user interest is gradually increasing in performances of vehicles as well as various functions and eco-friendliness thereof and, in particular, interiors thereof.

With the trend toward advanced-aesthetics of vehicles, many attempts are made to improve aesthetics of vehicle interior materials such as pillar trims and door trims.

One technique is to coat plastic components for vehicle interior materials or cover the same with fibers. This involves additional processes and materials, thus disadvantageously causing increased manufacturing costs and production of volatile organic compounds (VOCs) due to use of organic solvents and adhesive agents.

Another technique is to impart fiber texture to a resin composition by directly adding a fibrous polymer to the resin composition, as disclosed in Korean Patent No. 10-1154317. However, this method has drawbacks in that texture expression is changed depending on the color of plastic components for vehicle interior materials and there are various limitations on applying embossed patterns.

The above information disclosed in this Background section is only for enhancement of understanding of the background of the disclosure and therefore it may contain information that does not form the prior art that is already known in this country to a person of ordinary skill in the art.

SUMMARY OF THE DISCLOSURE

The present disclosure has been made in an effort to solve the above-described problems associated with the prior art.

It is one object of the present disclosure to provide a polypropylene composite resin composition with excellent expression of fiber texture.

It is another object of the present disclosure to provide a polypropylene composite resin composition with fiber texture which is less affected by embossed patterns.

It is another object of the present disclosure to provide a polypropylene composite resin composition with fiber texture which exhibits excellent durability, impact resistance, impact scratch and fouling resistance.

It is another object of the present disclosure to provide an eco-friendly polypropylene composite resin composition with fiber texture.

The objects of the present disclosure are not limited to those described above. The objects of the present disclosure will be clearly understood from the following description and could be implemented by means defined in the claims and a combination thereof.

In one aspect, the present disclosure provides a polypropylene composite resin composition with fiber texture including a polypropylene resin including homo-polypropylene, a first ethylene-propylene copolymer, a second ethylene-propylene copolymer or a combination thereof, and an ethylene/α-olefin copolymer.

The polypropylene composite resin composition may include 50% by weight to 70% by weight of the polypropylene resin, and 5% by weight to 25% by weight of the ethylene/α-olefin copolymer.

The homo-polypropylene may have a melt index of 1 g/10 min (2.16 kg, 230° C.) to 60 g/10 min (2.16 kg, 230° C.).

The first ethylene-propylene copolymer may have a melt index of 1 g/10 min (2.16 kg, 230° C.) to 60 g/10 min (2.16 kg, 230° C.) and may be obtained by polymerizing 50% by weight to 99% by weight of a propylene monomer with 1% by weight to 50% by weight of an ethylene monomer.

The second ethylene-propylene copolymer may have a melt index of 1 g/10 min (2.16 kg, 230° C.) to 100 g/10 min (2.16 kg, 230° C.), may be obtained by polymerizing 90% by weight to 99.9% by weight of a propylene monomer with 0.1% by weight to 10% by weight of an ethylene monomer, and may have an isotactic index of 97% or more.

The polypropylene resin may include the first ethylene-propylene copolymer and the second ethylene-propylene copolymer in a weight ratio of 1:1 to 3:1.

The ethylene/α-olefin copolymer may be a copolymer of ethylene and $C_4$-$C_8$ alkylene.

The ethylene/α-olefin copolymer may have a Mooney viscosity of 5 ML1+4 (121° C.) to 50 ML1+4 (121° C.) and a glass transition temperature of −60° C. to −40° C.

The polypropylene composite resin composition may further include an inorganic reinforcing material selected from the group consisting of talc having a sheet shape and a particle size of 0.5 μm to 10 μm; whisker having an acicular shape and having a length of 10 μm to 35 μm and a diameter of 0.3 μm to 1.5 μm, wollastonite, barium sulfate, calcium carbonate, silica, mica, calcium silicate, glass fibers, and a combination thereof.

The polypropylene composite resin composition may further include the inorganic reinforcing material in an amount of 1% by weight to 15% by weight.

The polypropylene composite resin composition may further include a fibrous polymer selected from the group consisting of nylon, polyethylene terephthalate (PET), polybutylene terephthalate (PBT), cellulose and a combination thereof, and having a diameter of 3 μm to 40 μm and a length of 0.3 mm to 4 mm.

The polypropylene composite resin composition may further include the fibrous polymer in an amount of 1.5% by weight to 5% by weight.

The polypropylene composite resin composition may further include a wood ingredient selected from the group consisting of coniferous wood flour, broadleaved wood flour, a wood chip, softwood pulp (SWP), hardwood pulp (HWP) and a combination thereof, and having a particle size of 210 μm to 300 μm.

The polypropylene composite resin composition may further include the wood ingredient in an amount of 2% by weight to 10% by weight.

The polypropylene composite resin composition may further include a stone ingredient selected from the group consisting of scoria, basalt and a combination thereof and having a particle size of 10 μm to 150 μm.

The polypropylene composite resin composition may further include the stone ingredient in an amount of 1% by weight to 10% by weight.

The polypropylene composite resin composition may further include an additive selected from the group consisting of a deodorant, a lubricant, an antioxidant, a heat stabilizer, a light stabilizer, a release agent, a pigment, an antistatic agent, an antibacterial agent, a processing aid, a smoke suppressant, an anti-dripping agent, a glass fiber, an anti-abrasion agent, a coupling agent, a compatibilizing agent and a combination thereof.

In another aspect, the present disclosure provides a molded article manufactured using the polypropylene composite resin composition.

The molded article may be an interior material for transport means.

Other aspects and exemplary embodiments of the disclosure are discussed infra.

DETAILED DESCRIPTION

The objects described above, and other objects, features and advantages will be clearly understood from the following exemplary embodiments with reference to the annexed drawings. However, the present disclosure is not limited to the embodiments and will be embodied in different forms. The embodiments are suggested only to offer thorough and complete understanding of the disclosed contents and sufficiently inform those skilled in the art of the technical concept of the present disclosure.

Like numbers refer to like elements throughout the description of the figures. In the drawings, the sizes of structures are exaggerated for clarity of the present disclosure. It will be understood that, although the terms first, second, etc. may be used herein to describe various elements, these elements should not be limited by these terms and are used only to distinguish one element from another. For example, within the scope defined by the present disclosure, a first element may be referred to as a second element and similarly, the second element may be referred to as the first element. Singular forms are intended to include plural forms as well, unless context clearly indicates otherwise.

It will be further understood that the terms "comprises" and/or "has" when used in this specification, specify the presence of stated features, numbers, steps, operations, elements, components or combinations thereof, but do not preclude the presence or addition of one or more other features, numbers, steps, operations, elements, components, or combinations thereof.

The polypropylene composite resin composition with fiber texture according to exemplary embodiments of the present disclosure includes a polypropylene resin including homo-polypropylene, a first ethylene-propylene copolymer, a second ethylene-propylene copolymer or a combination thereof, and an ethylene/α-olefin copolymer.

In addition, the polypropylene composite resin composition with fiber texture according to exemplary embodiments of the present disclosure may further include an inorganic reinforcing material, a fibrous polymer, a wood ingredient and a stone ingredient.

More specifically, the polypropylene composite resin composition with fiber texture according to exemplary embodiments of the present disclosure includes 50% by weight to 70% by weight of the polypropylene resin, 5% by weight to 25% by weight of the ethylene/α-olefin copolymer, 1% by weight to 15% by weight of the inorganic reinforcing material, 1.5% by weight to 5% by weight of the fibrous polymer, 2% by weight to 10% by weight of the wood ingredient and 1% by weight to 10% by weight of the stone ingredient.

In addition, the polypropylene composite resin composition with fiber texture according to exemplary embodiments of the present disclosure may further include an additive selected from the group consisting of a deodorant, a lubricant, an antioxidant, a heat stabilizer, a light stabilizer, a release agent, a pigment, an antistatic agent, an antibacterial agent, a processing aid, a smoke suppressant, an anti-dripping agent, a glass fiber, an anti-abrasion agent, a coupling agent, a compatibilizing agent and a combination thereof.

Hereinafter, respective ingredients of the present disclosure will be described in more detail.

1) Polypropylene Resin

The polypropylene resin includes homo-polypropylene, a first ethylene-propylene copolymer, a second ethylene-propylene copolymer or a combination thereof. When only one of the homo-polypropylene, the first ethylene-propylene copolymer and the second ethylene-propylene copolymer is used, impact resistance, heat resistance or the like of the molded article may be deteriorated. For this reason, a combination of two or more thereof may be used, and a combination of the first ethylene-propylene copolymer and the second ethylene-propylene copolymer may be used in a certain weight ratio.

The content of the polypropylene resin may be 50% by weight to 70% by weight. When the content is less than 50% by weight, overall properties including tensile strength, flexural strength, impact strength and the like of the molded article may be deteriorated and when the content exceeds 70% by weight, fiber texture may not be expressed due to excessively low contents of other ingredients.

a) Homo-Polypropylene

The homo-polypropylene has a melt index of 1 g/10 min (2.16 kg, 230° C.) to 60 g/10 min (2.16 kg, 230° C.) and an isotactic index (measured by C13-NMR) of 94% to 97%. When the isotactic index and the melt index satisfy these ranges, rigidity required for the molded article is met, and moldability and mechanical properties can be improved.

b) First Ethylene-Propylene Copolymer

The first ethylene-propylene copolymer may have a melt index of 1 g/10 min (2.16 kg, 230° C.) to 60 g/10 min (2.16 kg, 230° C.) and may be obtained by polymerizing 50% by weight to 99% by weight of a propylene monomer with 1% by weight to 50% by weight of an ethylene monomer. The content of the propylene monomer should be within the range defined above, in order to improve impact resistance and dimensional stability of the molded article.

c) Second Ethylene-Propylene Copolymer

The second ethylene-propylene copolymer may have a melt index of 1 g/10 min (2.16 kg, 230° C.) to 100 g/10 min (2.16 kg, 230° C.), may be obtained by polymerizing 90% by weight to 99.9% by weight of a propylene monomer with 0.1% by weight to 10% by weight of an ethylene monomer, and may have an isotactic index of 97% or more, specifically 97.5% to 99.5%.

When the isotactic index is less than 97%, tensile strength, flexural strength, impact strength and surface hardness of the molded article may be deteriorated.

In addition, when the melt index is less than 1 g/10 min (2.16 kg, 230° C.), the molded article cannot be formed due to deteriorated flowability, and when the melt index exceeds 100 g/10 min (2.16 kg, 230° C.), the impact resistance of the molded article may be significantly deteriorated.

In addition, when the content of the ethylene monomer is less than 0.1% by weight, impact resistance of the molded article may be deteriorated and when the content exceeds 10% by weight, rigidity may be deteriorated.

The second ethylene-propylene copolymer is a highly crystalline ethylene-propylene copolymer (highly crystalline polypropylene, HCPP) that has the melt index, content of the propylene monomer and the isotactic index, all satisfying the ranges defined above, which is distinguished from the first ethylene-propylene copolymer in terms of composition.

The polypropylene resin may include the first ethylene-propylene copolymer and the second ethylene-propylene copolymer in a weight ratio of 1:1 to 3:1. When the weight ratio exceeds 3:1, article moldability may be deteriorated and impact strength at room temperature may be deteriorated.

2) Ethylene/α-Olefin Copolymer

The ethylene/α-olefin copolymer is a copolymer of ethylene and α-olefin, is more specifically a copolymer of ethylene and $C_4$-$C_8$ alkylene, and may be selected from the group consisting of an ethylene/α-butylene copolymer, an ethylene/α-octylene copolymer and a combination thereof.

The ethylene/α-olefin copolymer has a Mooney viscosity of 5 ML1+4 (121° C.) to 50 ML1+4 (121° C.) and a glass transition temperature of −60° C. to −40° C.

When the Mooney viscosity is within the range defined above, there is an advantage of maintaining or improving mechanical properties of the molded article. Meanwhile, when the glass transition temperature is less than −60° C., rigidity and heat resistance of the molded article may be deteriorated and when the glass transition temperature exceeds −40° C., impact strength at low temperature may be deteriorated.

The content of the ethylene/α-olefin copolymer may be 5% by weight to 25% by weight. When the content is less than 5% by weight, impact strength of the molded article may be deteriorated and when the content exceeds 25% by weight, heat resistance of the molded article may be deteriorated.

3) Inorganic Reinforcing Material

The inorganic reinforcing material is an ingredient to reinforce the rigidity of the molded article and may be selected from the group consisting of talc, whisker, wollastonite, barium sulfate, calcium carbonate, silica, mica, calcium silicate, glass fibers and combinations thereof.

More specifically, the inorganic reinforcing material may be talc that has a sheet shape and a particle size of 0.5 μm to 10 μm. When the particle size of the talc is less than 0.5 μm, productivity of the molded article may be deteriorated and when the particle size exceeds 10 μm, the overall mechanical properties of the molded article may be deteriorated.

In addition, the inorganic reinforcing material may be whisker, or a whisker, that has an acicular shape, and has a length of 10 μm to 35 μm and a diameter of 0.3 μm to 1.5 μm. When the length of the whisker is less than 10 μm, rigidity and heat resistance may be deteriorated, and when the length exceeds 35 μm, the resin composition may flow in a specific direction during injection molding, deforming the molded article.

The content of the inorganic reinforcing material may be 1% by weight to 15% by weight, specifically 5% by weight to 10% by weight. When the content is less than 1% by weight, rigidity of the molded article may be deteriorated, and when the content exceeds 15% by weight, contents of other ingredients are excessively decreased, and moldability, scratch resistance and fouling resistance may be deteriorated.

4) Fibrous Polymer

The fibrous polymer may be selected from the group consisting of nylon, polyethylene terephthalate (PET), polybutylene terephthalate (PBT), cellulose and combinations thereof.

The fibrous polymer may be a combination of materials with different colors and may be variably combined according to desired properties such as colors of the molded article and other products adjacent thereto.

The fibrous polymer may have a diameter of 3 μm to 40 μm and a length of 0.3 mm to 4 mm. When the diameter of the fibrous polymer is less than 3 μm, fiber texture may not be expressed, and when the diameter exceeds 40 μm, impact strength of the molded article may be deteriorated. In addition, when the length of the fibrous polymer is less than 0.3 mm, fiber texture may not be expressed, and when the length exceeds 4 mm, the fibrous polymer may be entangled during manufacture of the molded article and dispersibility may be significantly deteriorated.

The content of the fibrous polymer is 1.5% by weight to 5% by weight, specifically 2% by weight to 4% by weight, more specifically 2.5% by weight to 3% by weight. When the content is less than 1% by weight, the fiber texture may not be expressed, and when the content exceeds 5% by weight, the fibrous polymer may be entangled due to excessive content.

5) Wood Ingredient

The wood ingredient may be selected from the group consisting of coniferous wood flour, broadleaved wood flour, wood chip, softwood pulp (SWP), hardwood pulp (HWP) and combinations thereof.

The coniferous wood flour means a by-product (sawdust) produced during processing of coniferous wood and the broadleaved wood flour means a by-product (sawdust) produced during processing of broadleaved wood. The coniferous wood flour and the broadleaved wood flour may be recycled from wood obtained during production of other products.

The polypropylene composite resin composition with fiber texture according to exemplary embodiments of the present disclosure further includes the wood ingredient, in addition to the fibrous polymer, to maximize fiber texture.

The wood ingredient may have a particle size of 210 μm to 300 μm. When the particle size of the wood ingredient is less than 210 μm, an expression of fiber texture may be insufficient and when the particle size exceeds 300 μm, a problem such as carbonation occurs in manufacture of the article, possibly causing a deterioration in tensile strength and impact strength.

The content of the wood ingredient may be 2% by weight to 10% by weight, specifically 2% by weight to 5% by weight, more specifically 3% by weight to 5% by weight. When the content is less than 2% by weight, an expression of fiber texture may be insufficient and when the content exceeds 10% by weight, problems such as carbonation, odor and deterioration in heat resistance may occur due to excessive content.

6) Stone Ingredient

The stone ingredient is an ingredient for minimizing influences of formation of a molded article with an embossed pattern on the resin composition.

The stone ingredient may be selected from the group consisting of scoria, basalt and combinations thereof. When volcanic stone such as scoria or basalt is used as the stone ingredient, volatile organic compounds (VOCs) are adsorbed on the stone. As a result, it is possible to prevent the VOCs from negatively affecting user health.

For example, the scoria may include, as main ingredients, 40% by weight to 50% by weight of silicon oxide, 10 to 20% by weight of aluminum oxide, 12% by weight to 17% by weight of iron oxide, 2% by weight to 8% by weight of titanium oxide and a predetermined amount of sodium oxide and potassium oxide. In addition, since scoria has a heat-resistant temperature of 1,200° C. or more, it can be used regardless of type of molded article and processing temperature.

When scoria and basalt are used in combination, they may be combined in a weight ratio of 1:0.2 to 1:0.5, although the ratio may be changed depending on color of the molded article. When the weight ratio exceeds 1:0.5, color balance of the resin composition may be difficult due to excessive content of black basalt.

In addition, the stone ingredient may have a spherical shape, but the present disclosure is not limited thereto. When the stone ingredient has a spherical shape, rather than a linear or acicular shape, is used, dispersibility of respective ingredients included in the resin composition can be improved.

The stone ingredient may have a particle size of 10 μm to 150 μm, specifically 40 μm to 100 μm. When the particle size of stone ingredient is less than 10 μm, improvement in dispersibility may be insufficient, and when the particle size exceeds 150 μm, physical properties including strength, rigidity and scratch resistance of the molded article may be unbalanced.

The content of the stone ingredient may be 1% by weight to 10% by weight. When the content of the stone ingredient is less than 1% by weight, the amount used may be excessively small and when the content of the stone ingredient exceeds 10% by weight, physical properties including strength, rigidity and scratch resistance of the molded article may be unbalanced.

7) Additives

The polypropylene composite resin composition with fiber texture according to exemplary embodiments of the present disclosure may further include an additive selected from the group consisting of a deodorant, a lubricant, an antioxidant, a heat stabilizer, a light stabilizer, a release agent, a pigment, an antistatic agent, an antibacterial agent, a processing aid, a smoke suppressant, an anti-dripping agent, a glass fiber, an anti-abrasion agent, a coupling agent, a compatibilizing agent and combinations thereof.

Hereinafter, the present disclosure will be described in more detail with reference to examples. However, these examples should not be construed as limiting the scope of the present disclosure.

Examples 1 to 5

Respective ingredients were prepared in accordance with the composition and the composition ratio, as shown in the following Table 1, and polypropylene composite resin compositions were then produced. Then, the compositions were injection-molded using an injection molding machine (model: LGE110, LS Cable & System Ltd.) at a cylinder temperature of 220° C. and a die temperature of 50° C. to produce specimens (molded articles).

TABLE 1

| Ingredients | Example 1 | Example 2 | Example 3 | Example 4 | Example 5 |
|---|---|---|---|---|---|
| Polypropylene resin[a] | 35 | 43.5 | 43 | 42.5 | 44.5 |
| Polypropylene resin[b] | 24 | 25 | 20 | 15 | 15 |
| Ethylene/α-olefin copolymer[c] | 20 | 10 | 15 | 20 | 20 |
| Inorganic reinforcing material[d] | 5 | 5 | 5 | 5 | 5 |
| Inorganic reinforcing material[e] | 5 | 5 | 5 | 5 | 5 |
| Fibrous polymer[f] | 1.5 | 2 | 2.5 | 3 | 3 |
| Wood ingredient[g] | 5 | — | — | — | — |
| Wood ingredient[h] | — | 5 | 5 | 5 | 3 |
| Stone ingredient[i] | 1 | 1 | 1 | 1 | 1 |
| Antioxidant | 3.5 | 3.5 | 3.5 | 3.5 | 3.5 |

In Table 1,
[a]Polypropylene resin: highly crystalline ethylene-propylene copolymer, melt index of 30 g/10 min (2.16 kg, 230° C.), weight average molecular weight of 221,000 g/mol, isotactic index of 98.5% to 99% (SK company)
[b]Polypropylene resin: ethylene-propylene copolymer, melt index of 30 g/10 min (2.16 kg, 230° C.), weight average molecular weight of 210,000 g/mol
[c]Ethylene/α-olefin copolymer: ethylene/α-octene copolymer, Mooney viscosity of 5 ML1 + 4 (121° C.) to 25 ML1 + 4 (121° C.), glass transition temperature of −55° C. to −62° C.
[d]Inorganic reinforcing material: talc, sheet shape, particle size of 8 μm to 10 μm (Koch Industries, Inc.)
[e]Inorganic reinforcing material: magnesium-whisker, length of 10 μm to 35 μm (UBE Industries, Inc.)
[f]Fibrous polymer: polyethylene terephthalate (PET), diameter of 7 μm, length of 3 mm, red
[g]Wood ingredient: broadleaved wood flour, particle size of 40 μm to 100 μm (Woori Deck Co., Ltd.)
[h]Wood ingredient: coniferous wood flour, particle size of 40 μm to 100 μm (Woori Deck Co., Ltd.)
[i]Stone ingredient: scoria, particle size of 100 μm, red brown Comparative Examples 1 to 6

Respective ingredients were prepared in accordance with the composition and the composition ratio, as shown in the following Table 2, and polypropylene composite resin compositions were then produced. Then, the compositions were injection-molded using an injection molding machine (model: LGE110, LS Cable & System Ltd.) at a cylinder temperature of 220° C. and a die temperature of 50° C. to produce specimens (molded articles).

TABLE 2

| Ingredients | Comparative Example 1 | Comparative Example 2 | Comparative Example 3 | Comparative Example 4 | Comparative Example 5 | Comparative Example 6 |
|---|---|---|---|---|---|---|
| Polypropylene resin[a] | 35 | 34.5 | 42.5 | 40.5 | 43 | 42 |
| Polypropylene resin[b] | 35 | 30 | 8 | 12 | 18 | 20 |
| Ethylene/α-olefin copolymer[c] | 10 | 15 | 20 | 20 | 20 | 20 |
| Inorganic reinforcing material[d] | 5 | 5 | 5 | 5 | 5 | 5 |
| Inorganic reinforcing material[e] | 5 | 5 | 5 | 5 | 5 | 5 |

TABLE 2-continued

| Ingredients | Comparative Example 1 | Comparative Example 2 | Comparative Example 3 | Comparative Example 4 | Comparative Example 5 | Comparative Example 6 |
|---|---|---|---|---|---|---|
| Fibrous polymer[f] | 0.5 | 1 | 3 | 3 | 3 | 3 |
| Wood ingredient[g] | 5 | 5 | — | — | — | — |
| Wood ingredient[h] | — | — | 12 | 10 | 1.5 | 0.5 |
| Stone ingredient[i] | 1 | 1 | 1 | 1 | 1 | 1 |
| Antioxidant | 3.5 | 3.5 | 3.5 | 3.5 | 3.5 | 3.5 |

[a] to [i] of Table 2 are the same as those of Table 1.

Comparative Examples 1 and 2 are specimens containing less than 1.5% by weight of the fibrous polymer.

Comparative Examples 3 and 4 are specimens where the weight ratio of the first ethylene-propylene copolymer (polypropylene resin[b] of Table 2) and the second ethylene-propylene copolymer (polypropylene resin[a] of Table 2) exceeds 1:3 and the content of the wood ingredient exceeds 10% by weight.

Comparative Examples 5 and 6 are specimens containing less than 2% by weight of the wood ingredient.

Test Example

Physical properties of specimens produced in Examples and Comparative Examples were measured in accordance with the following method. Results are shown in Table 3.

1) Melt index (MI): measured in accordance with ASTM D-1238 (Test conditions: 230° C., load: 21.2N).

2) Specific gravity: the center of a specimen, where flexural strength was measured, was measured in accordance with ASTM D792.

3) Tensile strength: measured in accordance with ASTM D-638 (Test conditions: 50 mm/min).

4) Flexural strength and flexural modulus: measured in accordance with ASTM D-790 at a load application rate of 30 mm/min.

5) IZOD impact strength: measured in accordance with ASTM D-256 at room temperature (23° C.) and −10° C. using Notched specimens.

6) Odor: A specimen that had an odor grade of 3 or less, based on MS 300-34, was considered to pass (test conditions: 80° C., determination of odor after standing at room temperature for 2 hours and for 1 hour).

7) Scratch: measured in accordance with MS 213-05 (Article 4.9). As scratch figure increases, scratch by external force increases. Thus, a specimen having a high scratch figure is unsuitable as a molded article.

8) Fouling: measured in accordance with MS210-05 (Article 4.13). As fouling figure increases, contamination by foreign material increases. Thus, a specimen having a high fouling figure is unsuitable as a molded article.

9) Fiber texture: measured by the naked eye. When there was no fiber texture, poor (Δ) was recorded, when fiber texture was expressed, but color matching with components was insufficient, good (○) was recorded, and when fiber texture was expressed and color matching with components was good, excellent (⊚) was recorded.

TABLE 3

| Items | Examples | | | | | Comparative Examples | | | | | |
|---|---|---|---|---|---|---|---|---|---|---|---|
| | 1 | 2 | 3 | 4 | 5 | 1 | 2 | 3 | 4 | 5 | 6 |
| MI [g/10 min] | 25.6 | 35.1 | 29.4 | 24.1 | 27.2 | 35.7 | 31.1 | 25.8 | 26.4 | 25.9 | 24.2 |
| Specific gravity [g/cm³] | 0.98 | 0.99 | 0.99 | 0.99 | 0.99 | 0.98 | 0.98 | 1.04 | 1.03 | 0.98 | 0.97 |
| Tensile strength [MPa] | 23.4 | 26.1 | 24.8 | 23.7 | 22.7 | 26.9 | 25.1 | 24.8 | 24.1 | 21.3 | 21 |
| Flexural strength [MPa] | 31 | 37.1 | 34.1 | 30.1 | 27.1 | 37.2 | 34.3 | 33.5 | 31.9 | 26.4 | 26.1 |
| Flexural modulus [MPa] | 1690 | 1980 | 1870 | 1720 | 1610 | 2040 | 1890 | 1820 | 1810 | 1560 | 1520 |
| IZOD impact strength at room temperature, [J/m] | 169 | 110 | 138 | 172 | 211 | 102 | 140 | 88 | 102 | 229 | 235 |
| IZOD impact strength, −10° C., [J/m] | 40 | 35 | 38 | 42 | 58 | 36 | 37 | 32 | 35 | 64 | 66 |
| Odor [grade] | 4.5 | 4 | 4 | 4 | 3 | 4.5 | 4.5 | 5 | 4.5 | 3 | 3 |
| Scratch [ΔL] | 2.1 | 1.9 | 1.7 | 1.6 | 0.7 | 1.8 | 1.9 | 3.1 | 2.5 | 0.7 | 0.6 |
| Fouling [ΔY] | 2.3 | 2.4 | 2.4 | 2.2 | 1.8 | 2.3 | 2.4 | 3.4 | 3 | 1.6 | 1.1 |
| Fiber texture | ○ | ○ | ⊚ | ⊚ | ⊚ | Δ | Δ | ⊚ | ⊚ | Δ | Δ |

As can be seen from Table 3, the specimens of Comparative Examples 1 and 2 containing less than 1.5% by weight of the fibrous polymer could not express fiber texture well.

In addition, specimens of Comparative Examples 3 and 4 where the weight ratio of the first ethylene-propylene copolymer to the second ethylene-propylene copolymer exceeded 1:3 were disadvantageous in reducing the weight of molded articles due to high specific gravities and had deteriorated impact strength at room temperature. In addition, Comparative Examples 3 and 4, which had wood ingredient contents exceeding 10% by weight, could express fiber texture well, but caused problems such as deterioration in scratch resistance and fouling resistance, and odor by carbonation.

On the other hand, when the content of wood ingredient was less than 2% by weight, the specimens of Comparative Examples 5 and 6 could not express fiber texture well.

Examples 1 to 5, which satisfied all conditions required for the polypropylene composite resin composition according to exemplary embodiments of the present disclosure, exhibited low specific gravity, good balance between tensile strength, flexural strength, flexural modulus, and impact strength at room temperature or at low temperature, less odor by carbonation of the wood ingredient, excellent scratch resistance and fouling resistance, and superior expression of fiber texture.

The disclosure has been described in detail with reference to exemplary test examples and examples thereof. However, it will be appreciated by those skilled in the art that changes may be made in these examples without departing from the principles and spirit of the disclosure, the scope of which is defined in the appended claims and their equivalents.

The polypropylene composite resin composition with fiber texture according to exemplary embodiments of the present disclosure can be produced into molded articles by a method such as extrusion molding, injection molding, blow molding or compression molding.

The molded article produced using the polypropylene composite resin composition with fiber texture according to exemplary embodiment of the present disclosure can be useful for interior materials of construction and transport means owing to luxurious appearance of fiber texture, but applications of the molded article include, without being limited to, containers, packing materials, household and kitchen appliances, electronic products, sports products, stationery and the like.

As is apparent from the foregoing, with the polypropylene composite resin composition according to exemplary embodiments of the present disclosure, it is possible to provide products with an excellent expression of fiber texture.

The polypropylene composite resin composition with fiber texture according to exemplary embodiments of the present disclosure can express, or enhance, the appearance of products in many ways because it is less affected by embossed patterns in the manufacture of products.

Products manufactured from the polypropylene composite resin composition with fiber texture according to exemplary embodiments of the present disclosure can be used under harsh environments such as extreme hot or cold areas for a long time due to excellent durability.

Products manufactured from the polypropylene composite resin composition with fiber texture according to exemplary embodiments of the present disclosure can protect users from external impact due to excellent impact resistance.

The polypropylene composite resin composition with fiber texture according to exemplary embodiments of the present disclosure can prevent environmental pollution because it is made of natural materials, in particular, recycled natural materials.

The objects of the present disclosure are not limited to those described above. It should be understood that effects of the present disclosure encompass all effects that can be inferred from the foregoing description.

The disclosure has been described in detail with reference to exemplary embodiments thereof. However, it will be appreciated by those skilled in the art that changes may be made in these embodiments without departing from the principles and spirit of the disclosure, the scope of which is defined in the appended claims and their equivalents.

What is claimed is:

1. A polypropylene composite resin composition with fiber texture comprising:
    a polypropylene resin comprising one or more selected from the group consisting of homo-polypropylene, a first ethylene-propylene copolymer, a second ethylene-propylene copolymer and a combination thereof;
    a fibrous polymer;
    wood ingredient; and
    an ethylene/α-olefin copolymer,
    wherein the first ethylene-propylene copolymer has a melt index of 1 g/10 min (2.16 kg, 230° C.) to 60 g/10 min (2.16 kg, 230° C.), and is obtained by polymerizing 50% by weight to 99% by weight of a propylene monomer with 1% by weight to 50% by weight of an ethylene monomer,
    wherein the second ethylene-propylene copolymer has a melt index of 1 g/10 min (2.16 kg, 230° C.) to 100 g/10 min (2.16 kg, 230° C.), is obtained by polymerizing 90% by weight to 99.9% by weight of a propylene monomer with 0.1% by weight to 10% by weight of an ethylene monomer, and has an isotactic index of 97% or more,
    wherein the wood ingredient is selected from the group consisting of coniferous wood flour, broadleaved wood flour, a wood chip, softwood pulp (SWP), hardwood pulp (HWP) and a combination thereof, and
    wherein the wood ingredient has a particle size of 210 μm to 300 μm.

2. The polypropylene composite resin composition according to claim 1, comprising:
    the polypropylene resin in an amount of 50% by weight to 70% by weight of the total composite resin composition; and
    the ethylene/α-olefin copolymer in an amount of 5% by weight to 25% by weight of the total composite resin composition.

3. The polypropylene composite resin composition according to claim 1, wherein the homo-polypropylene has a melt index of 1 g/10 min (2.16 kg, 230° C.) to 60 g/10 min (2.16 kg, 230° C.).

4. The polypropylene composite resin composition according to claim 1,
    wherein the first ethylene-propylene copolymer and the second ethylene-propylene copolymer are present in a weight ratio of 1:1 to 3:1.

5. The polypropylene composite resin composition according to claim 1, wherein the ethylene/α-olefin copolymer is a copolymer of ethylene and $C_4$-$C_8$ alkylene.

6. The polypropylene composite resin composition according to claim 1, wherein the ethylene/α-olefin copolymer has a Mooney viscosity of 5 ML1+4 (121° C.) to 50 ML1+4 (121° C.) and a glass transition temperature of −60° C. to −40° C.

7. The polypropylene composite resin composition according to claim 1, further comprising an inorganic reinforcing material selected from the group consisting of: talc having a sheet shape and a particle size of 0.5 μm to 10 μm, whisker having an acicular shape and having a length of 10 μm to 35 μm and a diameter of 0.3 μm to 1.5 μm, wollastonite, barium sulfate, calcium carbonate, silica, mica, calcium silicate, glass fibers and a combination thereof.

8. The polypropylene composite resin composition according to claim 7, wherein the inorganic reinforcing material is present in an amount of 1% by weight to 15% by weight of the total composite resin composition.

9. The polypropylene composite resin composition according to claim 1, wherein the fibrous polymer is selected from the group consisting of nylon, polyethylene terephthalate (PET), polybutylene terephthalate (PBT), cellulose and a combination thereof, and
the fibrous polymer has a diameter of 3 μm to 40 μm and a length of 0.3 mm to 4 mm.

10. The polypropylene composite resin composition according to claim 1, wherein the fibrous polymer is present in an amount of 1.5% by weight to 5% by weight of the total composite resin composition.

11. The polypropylene composite resin composition according to claim 1, wherein the wood ingredient is present in an amount of 2% by weight to 10% by weight of the total composite resin composition.

12. The polypropylene composite resin composition according to claim 1, further comprising a stone ingredient selected from the group consisting of scoria, basalt and a combination thereof and having a particle size of 10 μm to 150 μm.

13. The polypropylene composite resin composition according to claim 12, wherein the stone ingredient is present in an amount of 1% by weight to 10% by weight of the total composite resin composition.

14. The polypropylene composite resin composition according to claim 1, further comprising an additive selected from the group consisting of a deodorant, a lubricant, an antioxidant, a heat stabilizer, a light stabilizer, a release agent, a pigment, an antistatic agent, an antibacterial agent, a processing aid, a smoke suppressant, an anti-dripping agent, a glass fiber, an anti-abrasion agent, a coupling agent, a compatibilizing agent and a combination thereof.

15. A polypropylene composite resin composition with fiber texture comprising:
a polypropylene resin in an amount of 50% by weight to 70% by weight of the total composite resin composition;
an ethylene/α-olefin copolymer in an amount of 5% by weight to 25% by weight of the total composite resin composition;
an inorganic reinforcing material 1% by weight to 15% by weight of the total composite resin composition;
a fibrous polymer in an amount of 1.5% by weight to 5% by weight of the total composite resin composition;
a wood ingredient in an amount of 2% by weight to 10% by weight of the total composite resin composition; and
a stone ingredient in an amount of 1% by weight to 10% by weight of the total composite resin composition,
wherein the polypropylene resin comprises: a first ethylene-propylene copolymer having a melt index of 1 g/10 min (2.16 kg, 230° C.) to 60 g/10 min (2.16 kg, 230° C.) and being obtained by polymerizing 50% by weight to 99% by weight of a propylene monomer with 1% by weight to 50% by weight of an ethylene monomer; and a second ethylene-propylene copolymer having a melt index of 1 g/10 min (2.16 kg, 230° C.) to 100 g/10 min (2.16 kg, 230° C.), being obtained by polymerizing 90% by weight to 99.9% by weight of a propylene monomer with 0.1% by weight to 10% by weight of an ethylene monomer, and has an isotactic index of 97% or more,
wherein the ethylene/α-olefin copolymer has a Mooney viscosity of 5 ML1+4 (121° C.) to 50 ML1+4 (121° C.) and a glass transition temperature of −60° C. to −40° C.,
wherein the inorganic reinforcing material is selected from the group consisting of talc having a sheet shape and a particle size of 0.5 μm to 10 μm, whisker having an acicular shape and having a length of 10 μm to 35 μm and a diameter of 0.3 μm to 1.5 μm, and a combination thereof,
wherein the fibrous polymer is selected from the group consisting of nylon, polyethylene terephthalate (PET), polybutylene terephthalate (PBT), cellulose and a combination thereof,
wherein the fibrous polymer has a diameter of 3 μm to 40 μm and a length of 0.3 mm to 4 mm,
wherein the wood ingredient is selected from the group consisting of coniferous wood flour, broadleaved wood flour, a wood chip, softwood pulp (SWP), hardwood pulp (HWP) and a combination thereof,
the wood ingredient has a particle size of 210 μm to 300 μm,
wherein the stone ingredient is selected from the group consisting of scoria, basalt and a combination thereof, and
the stone ingredient has a particle size of 10 μm to 150 μm.

16. A molded article manufactured using the composition according to claim 1.

* * * * *